(12) United States Patent
Lee et al.

(10) Patent No.: US 6,815,238 B2
(45) Date of Patent: Nov. 9, 2004

(54) METHOD OF MANUFACTURING FIELD EMISSION DEVICE

(75) Inventors: Jeong-hee Lee, Seongnam-si (KR); Hang-woo Lee, Suwon-si (KR); Shang-hyeun Park, Boryeong-si (KR); You-jong Kim, Seoul (KR)

(73) Assignee: Samsung SDI Co., Ltd., Suwon-si (KR)

( * ) Notice: Subject to any disclaimer, the term of this patent is extended or adjusted under 35 U.S.C. 154(b) by 0 days.

(21) Appl. No.: 10/776,511

(22) Filed: Feb. 12, 2004

(65) Prior Publication Data

US 2004/0161867 A1 Aug. 19, 2004

(30) Foreign Application Priority Data

Feb. 12, 2003 (KR) .................................. 10-2003-0008762

(51) Int. Cl.[7] .............................................. H01L 21/00
(52) U.S. Cl. ........................................ 438/20; 313/309
(58) Field of Search ........................... 438/20; 313/309; 445/24

(56) References Cited

U.S. PATENT DOCUMENTS

| | | | |
|---|---|---|---|
| 6,339,281 B2 | 1/2002 | Lee et al. | |
| 6,440,761 B1 | 8/2002 | Choi | |
| 6,440,763 B1 * | 8/2002 | Hsu | 438/20 |
| 6,472,802 B1 * | 10/2002 | Choi et al. | 313/309 |
| 6,682,383 B2 * | 1/2004 | Cho et al. | 445/50 |
| 6,703,252 B2 * | 3/2004 | Chen et al. | 438/20 |
| 6,710,539 B2 * | 3/2004 | Lee | 313/497 |
| 6,741,019 B1 * | 5/2004 | Filas et al. | 313/355 |
| 2001/0020813 A1 * | 9/2001 | Lee | 313/309 |
| 2004/0108515 A1 * | 6/2004 | Muroyama et al. | 257/144 |

* cited by examiner

*Primary Examiner*—Alexander Ghyka
(74) *Attorney, Agent, or Firm*—Robert E. Bushnell, Esq.

(57) ABSTRACT

A method of manufacturing a field emission device. In the method, emitters are formed using a lift-off process, and an isolation layer is formed between a sacrificial layer for patterning the emitters and emitter materials. The isolation layer prevents the sacrificial layer from reacting on the emitter materials to facilitate the lift-off process. Thus, the field emission device, which uniformly emits light having a high brightness, can be obtained.

14 Claims, 12 Drawing Sheets

METHOD OF MANUFACTURING FIELD EMISSION DEVICE

CLAIM OF PRIORITY

This application claims the priority of Korean Patent Application No. 2003-8762, filed on Feb. 12, 2003, in the Korean Intellectual Property Office, the disclosure of which is incorporated herein by reference in its entirety.

BACKGROUND OF THE INVENTION

1. Field of the Invention

The present invention relates to a method of manufacturing an electric field device, and more particularly, to a method of manufacturing an electric field device that can uniformly emit light having a high brightness.

2. Description of the Related Art

Carbon nanotubes (CNTs) have a small diameter and a high aspect ratio of diameter to length and thus can emit electrons even at a low voltage. Since the CNTs have excellent electron emission characteristics and are chemically and physically durable, extensive studies have been performed on the physical properties and applicability thereof. Meanwhile, spindt-type field emission devices use metal micro tips as electron emitters. The micro tips have a problem that the life span is reduced under atmospheric gas and a non-uniform electric field during emission of electrons. A low work function of an emitter is required in order to lower a driving voltage for emitting electrons, but conventional micro tips are reaching the technical limit. To overcome these problems, field emission arrays (FEAs) using the foregoing CNTs as electron emitting sources have been developed because the CNTs have a high aspect ratio and are highly durable and conductive.

U.S. Pat. No. 6,440,761 to Choi discloses an FEA using a paste mixture of electron emission materials and a method of fabricating the same. U.S. Pat. No. 6,339,281 to Lee et al. discloses an FEA and a method of fabricating the same, in which CNTs formed by growth method are used as emitters. Generally, since it is easier to form emitters using a paste mixture than by a growth method, the former method is preferred. Unfortunately, the method of making in Choi '761 and Lee '281 has a significantly high failure rate and the resulting devices do not always have superior electrical characteristics.

SUMMARY OF THE INVENTION

It is therefore an object of the present invention to provide an improved method of making a field emission device.

It is also an object to provide a method for making a field emission device that results in a field emission device that has superior electron emission characteristics.

It is yet another object of the present invention to provide a method of manufacturing a field emission device that results in a field emission device that uniformly emits light having a high brightness.

It is still an object of the present invention to provide a method of manufacturing a field emission device which prevents a short circuiting between the emission material and the gate, thus forming emitters having excellent electron emission characteristics.

These and other objects can be achieved by a method of manufacturing a field emission device. The method begins with preparing a substrate structure, forming a cathode electrode on the substrate, forming a gate insulating layer on the cathode electrode, the gate insulating layer having holes or perforations that expose portions of the cathode electrode, and a gate electrode on the gate insulating layer, the gate having gate holes or perforations that correspond to the holes in the gate insulating layer. A patterned sacrificial layer is then formed on a surface of the structure except on areas of the cathode that are exposed. Then an isolation layer is formed on the entire structure including on the patterned sacrificial layer and on exposed portions of the cathode. An organic emission layer is then formed on the entire structure over the isolation layer. The organic emission layer and the isolation layers are patterned during lift off of the patterned sacrificial layer. A solvent dissolves the patterned sacrificial layer and portions of the isolation layer and the emission layer over the patterned sacrificial layer are washed away during the lift off. The resulting patterned emission layer takes the form of emitters, whose pattern is dictated by the patterned sacrificial layer. Then, the emitters are applied with electricity and fired to rid of any isolation material between the remaining organic emission material and the cathode electrode.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1A:
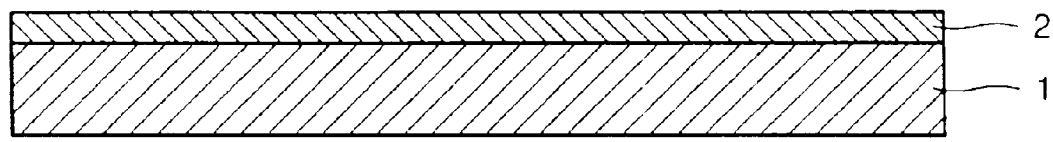
FIGS. 1A through 1G are cross-sectional views illustrating a method of manufacturing a field emission device absent lift off, absent sacrificial layers and absent isolation layers.

A method of manufacturing a field emission device using a paste mixture will now be described briefly with reference to FIGS. 1A through 1G. Turning now to FIG. 1A, a cathode electrode 2 is first formed on a substrate 1. Substrate 1 is preferably made of soda lime glass. Cathode electrode 2 is preferably made of indium tin oxide (ITO). Then, the cathode electrode layer 2 is patterned using a photolithography process.

Figure 1B:
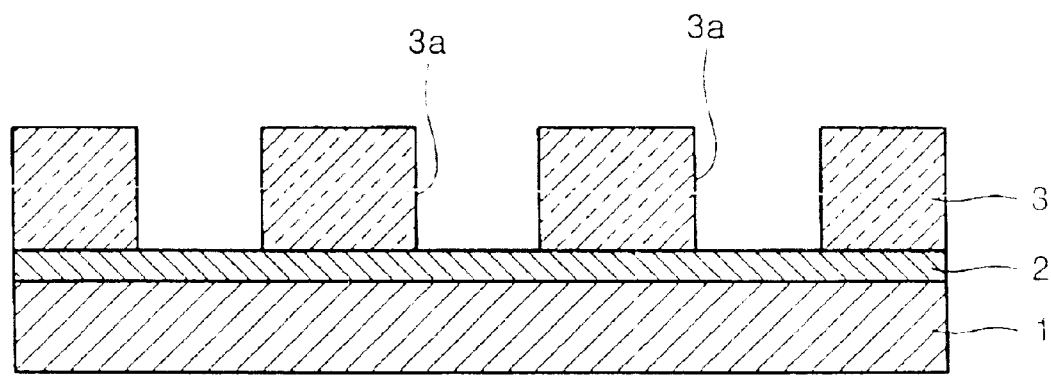

Turning now to FIG. 1B, a gate insulating layer 3 is formed over substrate 1 and over cathode electrode 2. The gate insulating layer 3 has holes (or perforations in the gate insulating layer) 3a which expose portions of the cathode electrode 2. The gate insulating layer 3 can be formed using, for example, a screen printing technique.

Figure 1C:
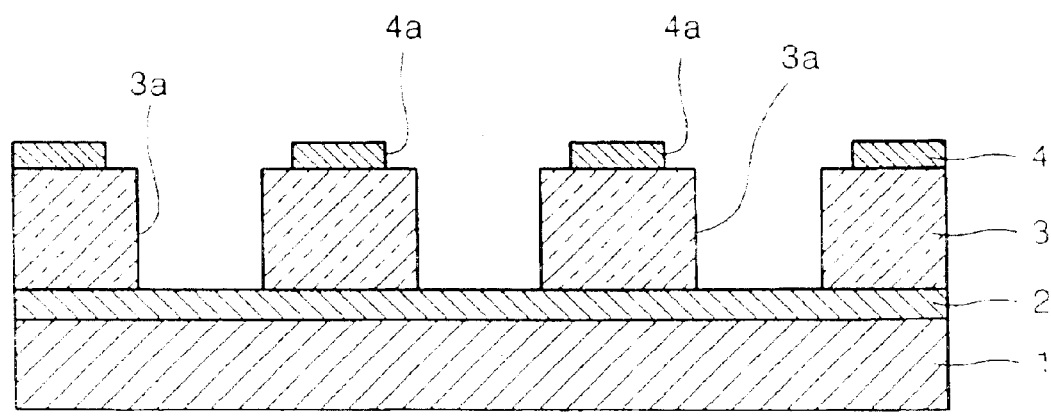

Turning now to FIG. 1C, agate electrode 4 is formed on the gate insulating layer 3. The gate electrode 4 has gate holes (or perforations in the gate electrode layer) 4a, which correspond to the holes 3a. The gate electrode 4 is formed by depositing a metal and patterning the same using a thin-film forming process or a thick-film forming process. Alternatively, the gate electrode 4 may be formed by a screen printing technique using a metal paste.

Figure 1D:
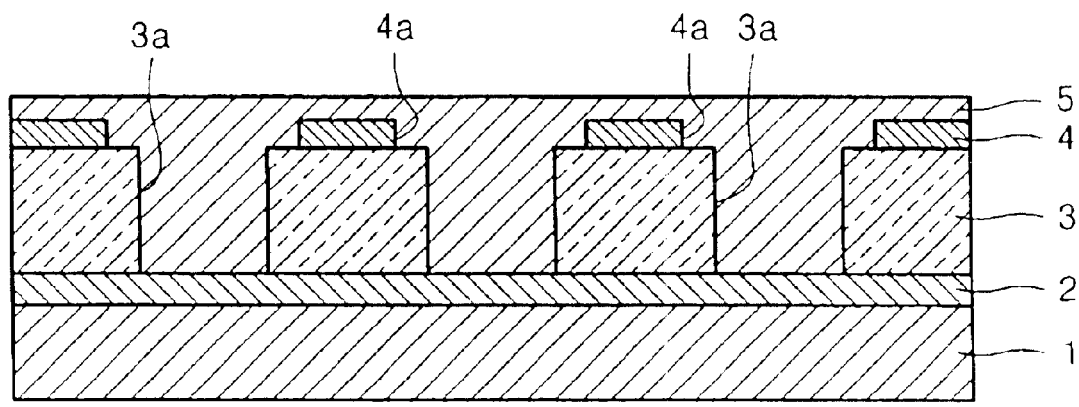

Turning now to FIG. 1D, a paste-type electron emission material layer 5 is formed to cover the gate electrode 4 and fill the gate holes 3a and 4a. The paste-type electron emission material layer 5 is includes photoresist and electron emission materials, such as CNTs or nanoparticles. Preferably, the photoresist in the emission layer 5 is a negative photoresist that is sensitive to ultra violet light.

Figure 1E:
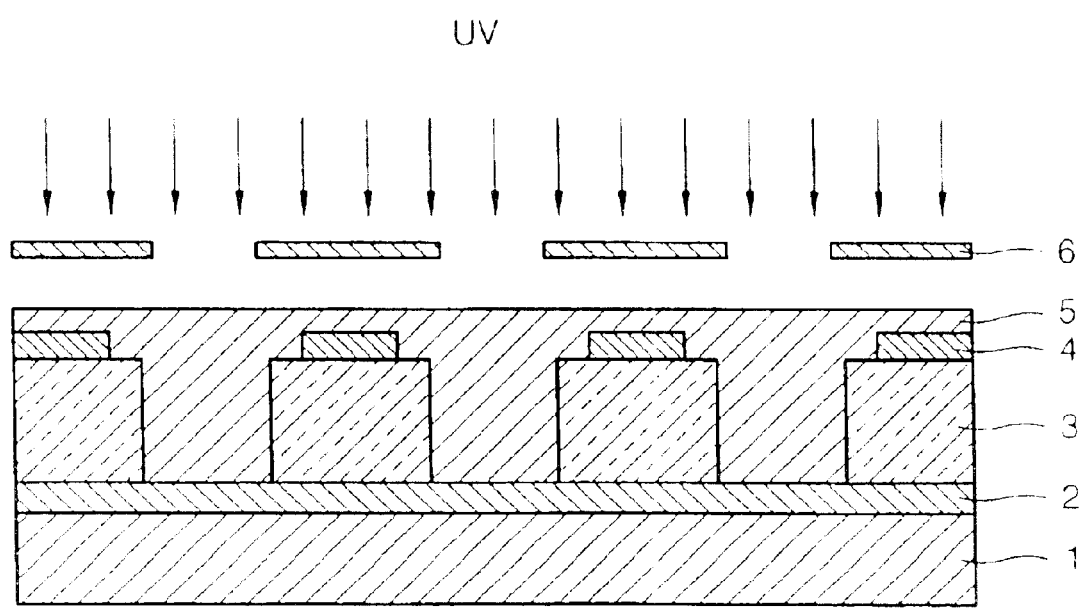

Turning now to FIG. 1E, the electron emission material layer 5 is exposed using a mask 6 using the ultra violet light. Since the electron emission material layer 5 contains a negative photoresist, if ultraviolet (UV) rays are irradiated into the holes 3a, the photoresist in the holes 3a is cured by the exposure process while portions of the emission layer 5 that does not get exposed to the ultra violet light (i.e., the gate portion) is never cured and is therefore removed.

Figure 1F:
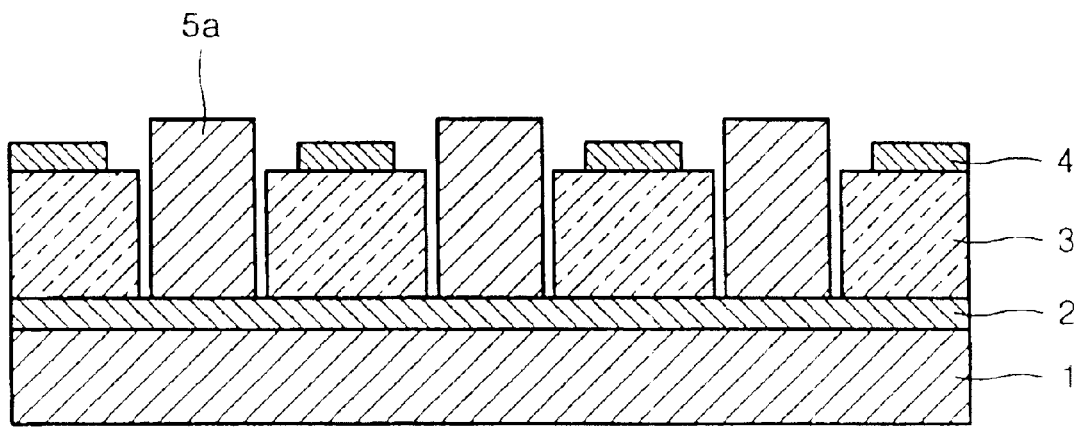
Figure 1G:
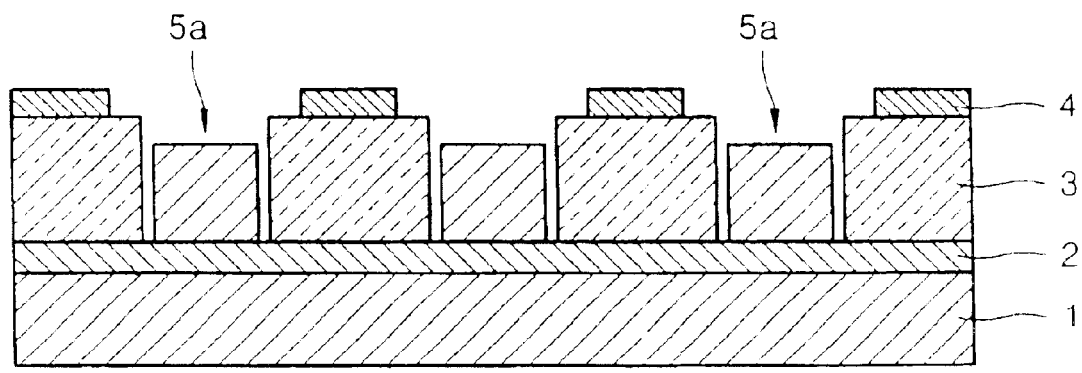

Turning now to FIG. 1F, the electron emission material layer 5 is developed, thereby removing unexposed portions of the emission layer over and near the gates while leaving emission material 5 in the middle of the holes 3a and 4a. Turning now to FIG. 1G, FIG. 1G illustrates the final structure. The emitters Sa are completely hardened and constricted by firing the emitters Sa at predetermined temperature, thereby causing emitters 5a to shrink between FIGS. 1F and 1G resulting in the tops of the emitters 5a being lower in height than the gate insulating material 3 and the gate electrode 4.

The above-described method has the following problems. While the emitters 5a are being formed using the electron emission material layer 5, the patterning and developing process of the ganic emission material does not produce perfect emitter structures. In other words, there is still some remaining organic emission material 5 in the unexposed portions of mask 6. This remaining unexposed organic emission material often causes an electrical short between the emitter structure 5a and the gate 4. The occurrence of such a short between the emitter 5a and the gate 4 results in poor performance of the emission device, such as an inability to achieve uniform emission between the emitters and the inability of the emitters to produce light of high brightness. These short circuit problems are caused by the photolithography process, which leads to emission materials remaining between the gate 4 and the emitters 5a.

One solution to the above short circuiting problem is to incorporate a lift-off process when making the emitter structure. According to a lift-off process, a sacrificial layer for lift-off layer is selectively applied to the structure immediately prior to the application of the emission layer. Specifically, the sacrificial layer is formed over the gate structures where no emission layer is desired and is not formed in the hole region where the emission layer is desired. Then, the emission layer is deposited over the entire structure including the patterned sacrificial layer. Then, the structure is exposed to a developing solution or a lift off solution. This solution dissolves the entire sacrificial layer in the structure. As a result, emission material formed on top of the sacrificial layer is washed away while emission material not formed over a sacrificial material remains. This results in a structure with emitters present and overcomes the problems of having left over emission material between the emitters and the gate forming an electrical short between the emitters and the gate. This is because by using lift off, no emission material is left on or near the gate.

However, another problem is created when a patterned sacrificial layer is used in a lift off process. The sacrificial layer and the emission layer have a tendency to form a strong, unwanted chemical reaction between each other that can harm the emission layer. Therefore, in order to successfully use the lift off process to overcome the shorting problem, the process of making should be designed so that the sacrificial layer never comes in contact with the emission layer.

When a field emission device is-manufactured, a sacrificial layer may contact emission material. This contact causes a reaction between materials of the sacrificial layer and the materials of the emitters. The sacrificial layer may be formed of novolac photosensitive resin. If a solvent, e.g., Texanol, which has a strong solubility of the resin, is included in the electron emission materials, an attack against the sacrificial layer by the solvent in the emission layer is unavoidable. That is, when the electron emission materials contact the sacrificial layer, if the highly soluble Texanol dissolves a novolac matrix of the sacrificial layer, ingredients of the dissolved novolac matrix are mixed with ingredients of an acrylic matrix of the electron emission materials, thus inducing a tight combination of the two matrixes. In this state, it is impossible to pattern emitters using a developing solution or a lift-off solvent.

Figure 2A:
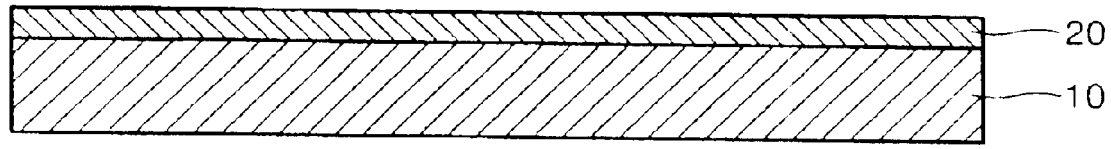
FIGS. 2A through 2I are cross-sectional views illustrating a method of manufacturing a field emission device according to an embodiment of the present invention.

A method of manufacturing a field emission device according to an embodiment of the present invention will now be described with reference to FIGS. 2A through 2I. Turning to FIG. 2A, a cathode electrode 20 is formed on a substrate 10. Substrate 10 is preferably made of soda lime glass. Cathode electrode 20 is preferably made of ITO. To form the cathode electrode 20, an ITO is deposited on the substrate 10 and then patterned using a photolithography process.

Figure 2B:
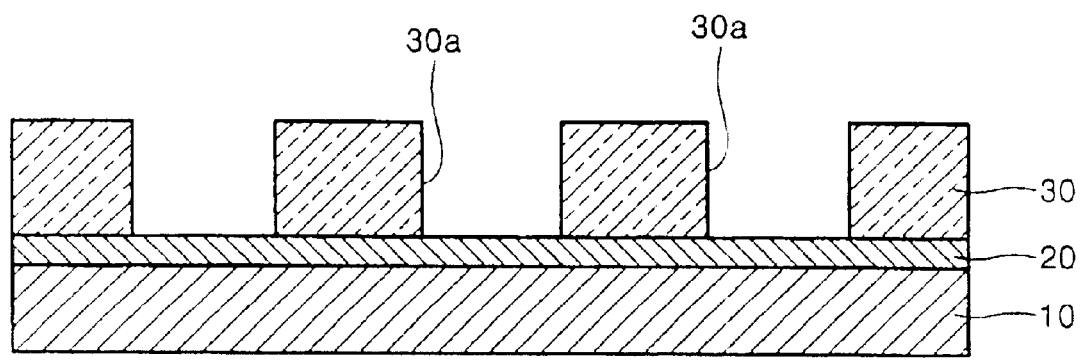

Turning now to FIG. 2B, a gate insulating layer 30 is formed over the cathode electrode and the substrate 10. Holes (or perforations) 30a are formed through the gate insulating layer 30 such that portions of the cathode electrode 20 are exposed. The gate insulating layer 30 can be formed by a screen printing technique or other various known methods including deposition and patterning of an insulating material.

Figure 2C:
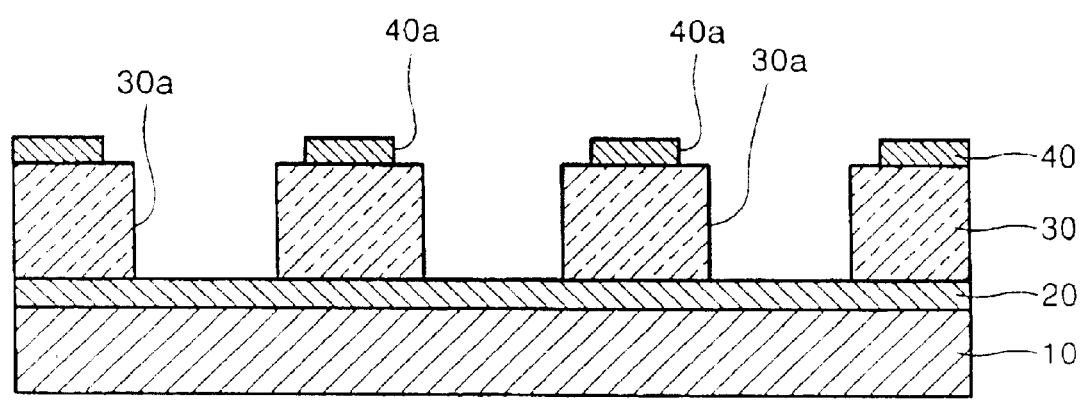

Turning now to FIG. 2C, a gate electrode 40 is formed on the gate insulating layer 30. Gate holes (or perforations) 40a are formed through the gate electrode 40 so as to correspond to the holes 30a. The gate electrode 40 can be formed by a thin-film forming process including deposition and patterning of a metal material or a thick-film forming process including a screen printing technique using a metal paste. Up until this point, the process is similar to that of FIGS. 1A through 1C.

Figure 2D:
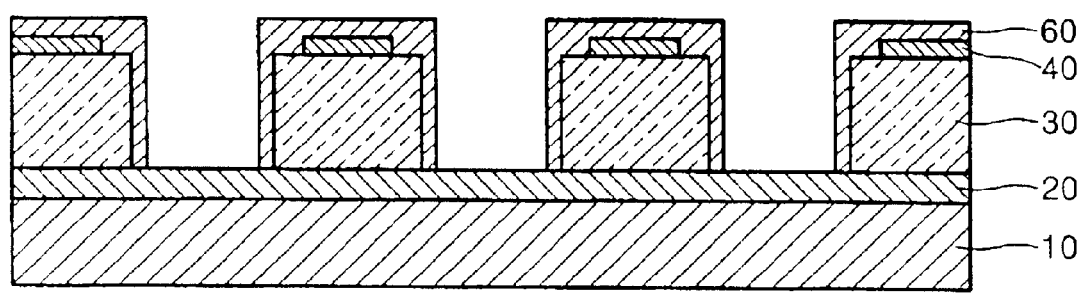

Turning now to FIG. 2D, a patterned sacrificial layer 60 for lift-off is formed on a surface of the gate electrode 40 and inner walls of the holes 30a, excluding bottoms of the holes 30a. The patterned sacrificial layer 60 is formed by a screen printing technique using a paste or a spin coating method using a sol-gel or a slurry solution and soft-baked.

Figure 2E:
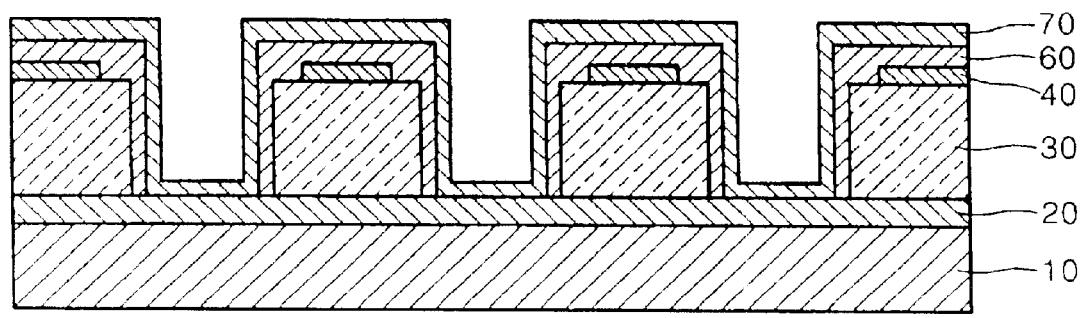

Turning now to FIG. 2E, an isolation layer 70 is formed on the sacrificial layer 60. Like the sacrificial layer 60, the isolation layer 70 is formed by a screen printing technique using a paste or a spin coating method using a sol-gel or a slurry solution and soft-baked. The isolation layer 70 should be formed of a material that does not react with the sacrificial layer 60 or hardly reacts thereon so as not to hinder the entire manufacturing process. Also, the isolation layer 70 should be formed of a material that hardly reacts on electron emission materials which will later be formed on the isolation layer 70. As described above, the isolation layer 70 can be formed of a resistive material to form a material layer resistive to lower portions of the emitters and also may be formed of photosensitive photoresist. The resistive material can be either $SiO_2$, MgO, a-Si or p-Si. If the isolation layer 70 does not include a resistive material but is used only to prevent electron emission materials from contacting the sacrificial layer 60, the isolation layer 70 is not formed on the bottoms of the holes 30a so as not to cover the cathode electrode 20. If isolation layer 70 is made of an electrically resistive material, then isolation layer 70 covers the gate structure 30, 40, the bottoms of the holes 30a, and the sidewalls of the holes. FIG. 2E illustrates the scenario where the isolation layer 70 is an electrically resistive layer and thus also covers the bottoms of holes 30a.

Figure 2F:
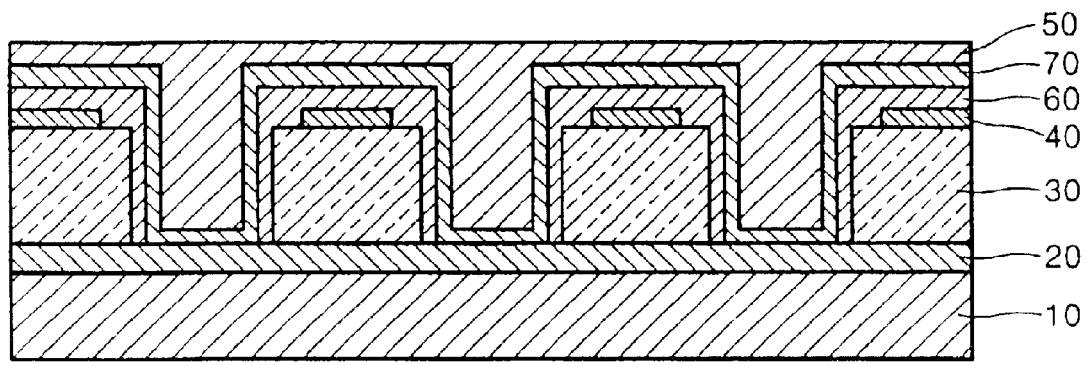

Turning now to FIG. 2F, an electron emission material layer 50 is formed on the resultant structure using a binder and electron emission materials, such as CNTs or nanoparticles. The electron emission material layer 50 can be formed of conductive particles, e.g., Ag, to enhance the supply of a current. This electron emission material layer 50 can be formed by a screen printing technique using a paste or a spin coating method using a sol-gel or a slurry solution. The electron emission material layer 50 preferably has a binder. The binder may or may not be a photoresist that is later blanket cured by a blanket exposure.

Figure 2G:
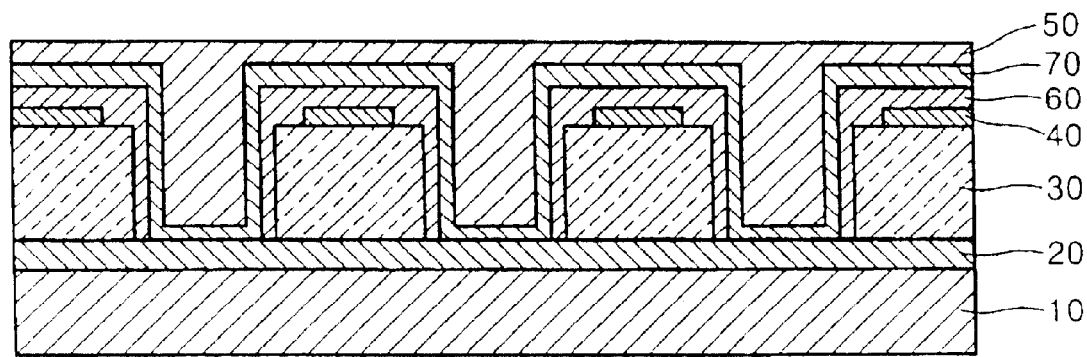
Figure 2G:

Turning now to FIG. 2G, FIG. 2G illustrates the entire field emission device being exposed by ultra violet (UV) light. In FIG. 2G, it is assumed that photoresist is used as the binder for the electron emission material layer 50. In addition, it is assumed that the photoresist used in emission layer 50 is a negative photoresist that is cured by exposure to UV light. Although FIG. 2G illustrates the scenario where negative UV photoresist is used for the binder for emission layer 50, in no way is the present invention limited to such. Other photoreisists or even a non-photo sensitive binder may instead be used to bind electron emission material layer 50. As illustrated in FIG. 2G, it is to be appreciated that the blanket exposure to UV light in FIG. 2G serves only to cure or harden organic emission layer 50 and does not serve to pattern organic emission layer 50. Instead, the later patterning of organic emission layer 50 into emitters 50a is determined by the pattern of sacrificial layer 60 and the subsequent lift off process.

Figure 2H:
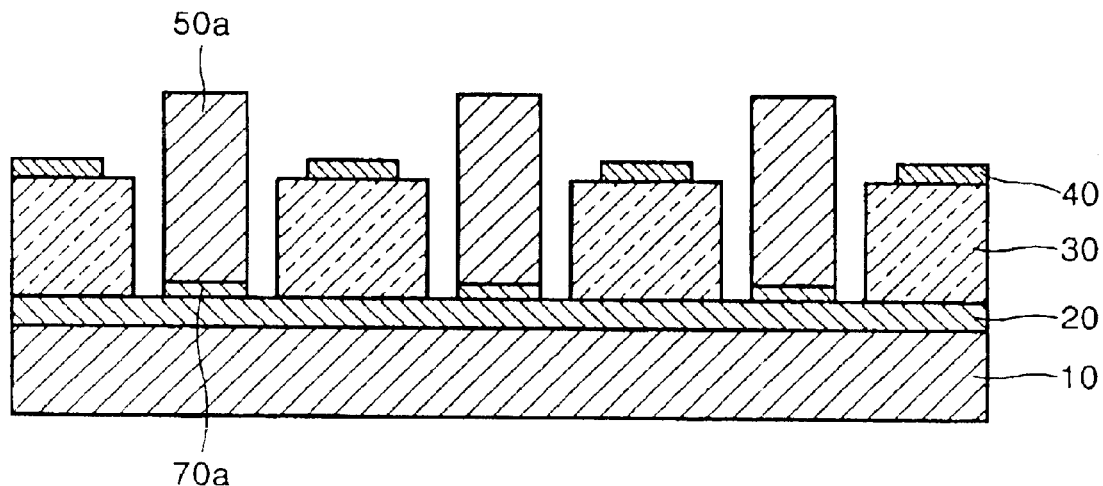

Turning now to FIG. 2H, a lift-off process for removing the sacrificial layer 60 using an etchant is performed, thereby forming preliminary emitters 50a only in the center of the bottoms of the holes 30a. In lift off, not only is sacrificial layer 60 removed, but also portions of isolation layer 70 and bound emission layer 50 supported by sacrificial layer 60 are removed. It is to be appreciated that the final pattern of emitters 50a is dictated by the patterning of sacrificial layer 60 as per FIG. 2D and the subsequent lift off process and the pattern of emitters 50a is not in any way determined by the blanket exposure to UV light of FIG. 2G. As illustrated in FIG. 2H, the preliminary emitters 50a include a remaining portion of the isolation layer 70 between the bottom of emitters 50a and the top of cathode electrode layer 20.

Figure 2I:
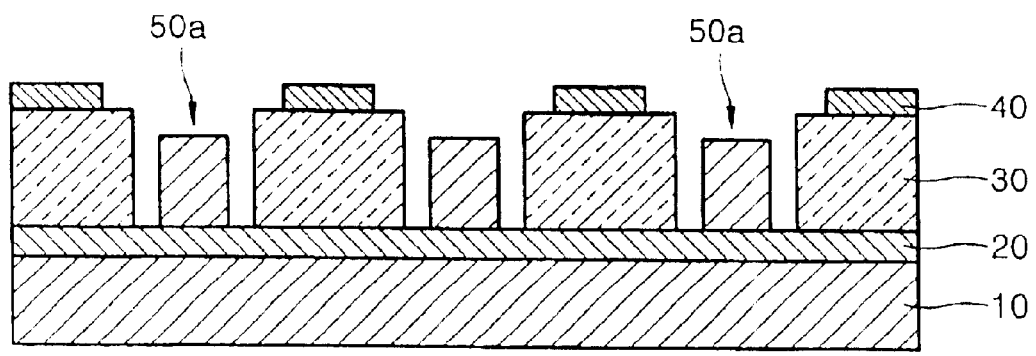

Turning now to FIG. 2I, the emitters 50a are fired at a predetermined temperature and completely hardened and constricted. Thus, the tops of the emitters 50a become lower in height than the gate holes 40a. As the result of firing, pyrolytic ingredients are completely removed from the remaining isolation layer 70a, and the resistive material remains to a very small thickness. Using the process of FIGS. 2A through 2I, lift off can be used without the occurrence of an adverse chemical reaction between the layers.

An electron emission material 50 of the present invention contains CNTs or nanoparticles, which enable the emission of electrons by an electric field. Also, the emitters 50a can be formed of particles of highly conductive metals, such as Ag and Ti, to enhance the supply of a current.

If the resistive material, i.e., the remaining material of the isolation layer 70a, remains at the lower portions of the emitters 50a as described above, the resistive material allows a current to be uniformly supplied even to emission points of the CNTs or nanoparticles, which are uniformly distributed in the emitters 50a, which are highly conductive due to the conductive metal particles. The resistive material is preferably formed to a predetermined thickness to effectively aid the above-described supply of the current. Accordingly, in the present invention, an isolation layer 70 is formed on the sacrificial layer 60 to prevent materials of the sacrificial layer 60 from contacting the electron emission materials 50 of the emitters 50a.

In the present invention, an isolation layer 70 is interposed between a sacrificial layer 60 and an electron emission material layer 50, thereby preventing the sacrificial layer 60 that may be formed of a photoresist from reacting on the electron emission material layer 50. Thus, a tight combination can be prevented between the sacrificial layer 60 and the electron emission material layer 50 so as to facilitate a lift-off process for forming emitters 50a.

If a resistive material layer 70a is disposed at the lower portions of the emitters 50a according to the embodiment of the present invention, the resistive material layer 70a allows a current to be uniformly supplied to a highly conductive electron emission material layer. Thus, the emitters 50a can have uniform electron emission characteristics.

Figure 3A:
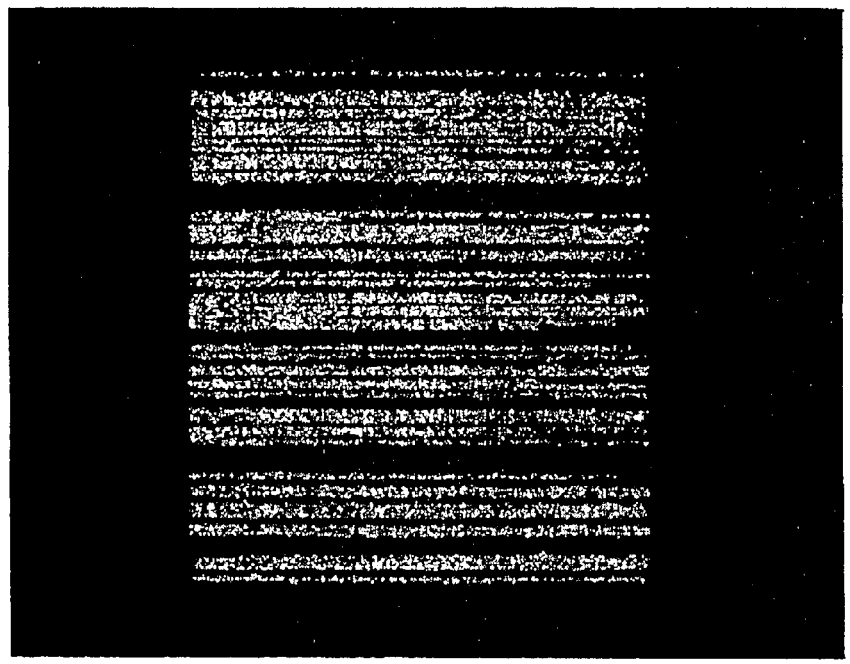
FIGS. 3A and 3B are photographs illustrating electron emission of a field emission device manufactured by a method comprising a screen printing technique and a photolithography process and using neither lift off nor a sacrificial layer nor an isolation layer.
Figure 3B:
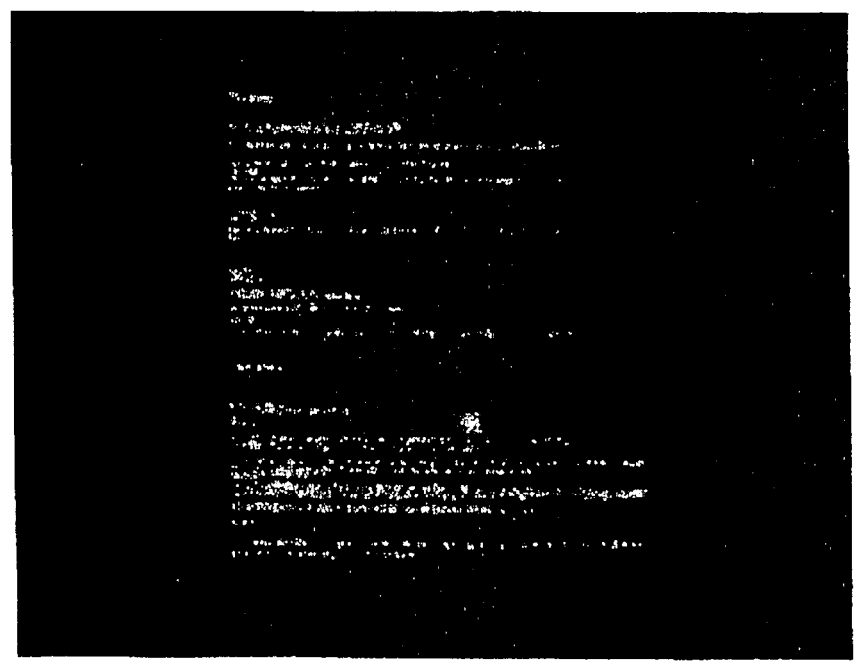

Turning now to FIGS. 3A and 3B, FIGS. 3A and 3B are photographs illustrating electron emission of a field emission device manufactured by a method similar the method described in conjunction with FIGS. 1A through 1G using a screen printing method and a photolithography process and not using lift off, nor a sacrificial layer and not using an isolation layer. FIG. 3A illustrates screen brightness in conditions of an anode voltage of 1 KV, a gate voltage of 55 V, and an electron emission current of 367.5 µA, while FIG. 3B illustrates screen brightness in conditions of an anode voltage of 1 KV, a gate voltage of 50 V, and an electron emission voltage of 58.6 µA.

Figure 4A:
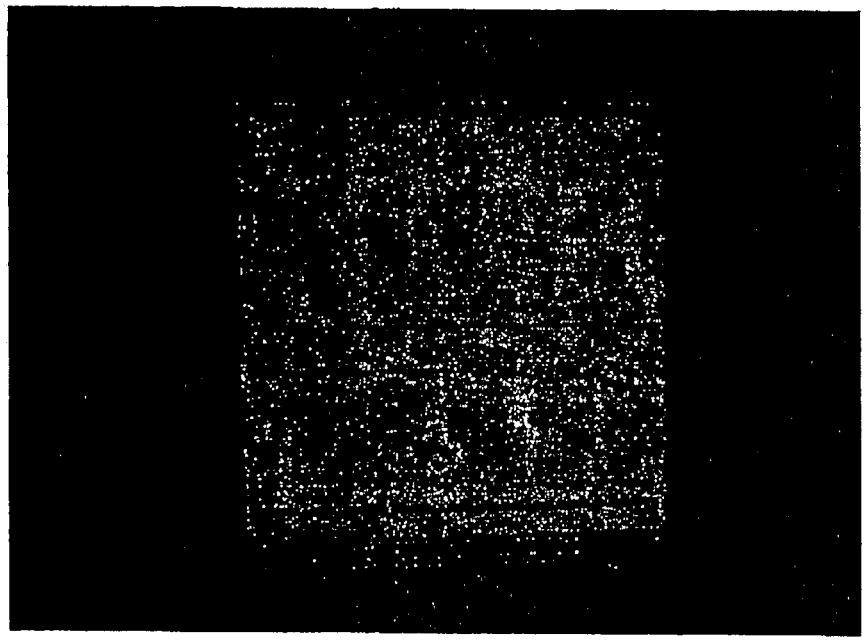
FIGS. 4A and 4B are photographs illustrating electron emission of a field emission device manufactured by a method according to the present invention as illustrated in FIGS. 2A through 2I.
Figure 4B:
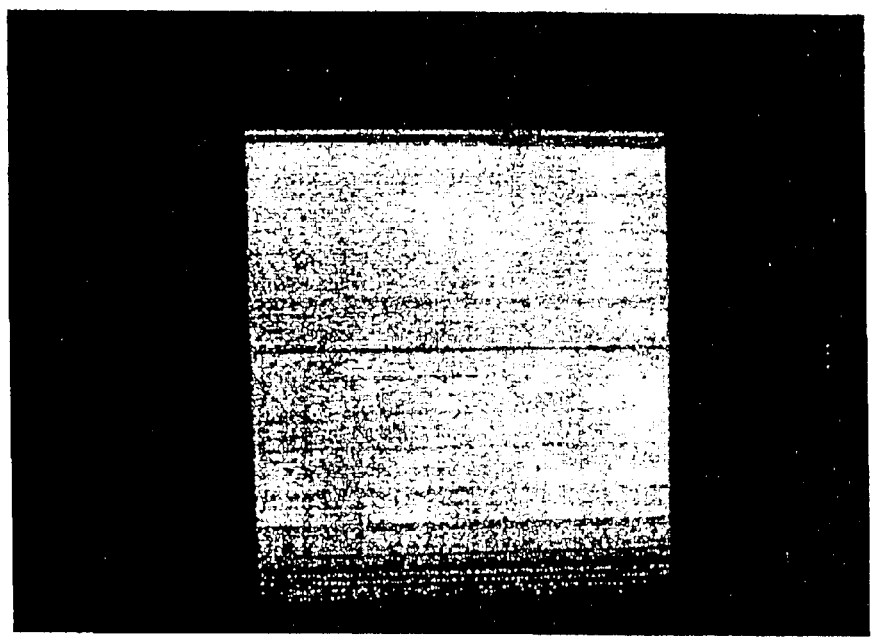

Turning now to FIGS. 4A and 4B, FIGS. 4A and 4B are photographs illustrating electron emission of a field emission device manufactured by the method described in conjunction with FIGS. 2A to 2I according to the present invention. FIG. 4A illustrates screen brightness in conditions of an anode voltage of 1 KV, a gate voltage of 55 V, and an electron emission current of 1.13 mA, while FIG. 4B illustrates screen brightness in conditions of an anode voltage of 1 KV, a gate voltage of 60 V, and an electron emission current of 2 mA.

Comparing FIGS. 4A and 4B with FIGS. 3A and 3B respectively, the field emission device manufactured by the method of FIGS. 1A through 1G has a lower electron emission current than the field emission device manufactured by the method of FIGS. 2A through 2I. The emission device manufactured according to FIGS. 2A through 2I is very likely to emit few electrons. However, the field emission device of the present invention can solve the short circuiting problem between the gate and the emitters, has a very high electron emission current, and ensures uniform brightness.

Figure 5A:
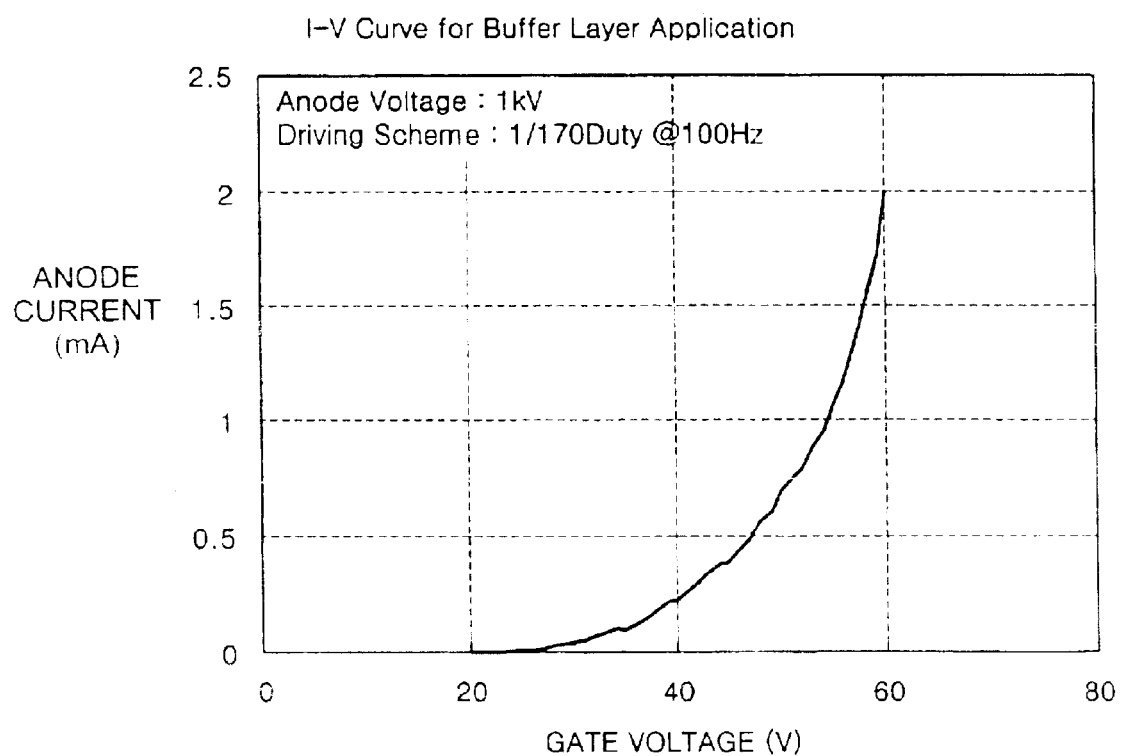
FIG. 5A is a graph illustrating empirically a relationship between an anode current and a gate voltage of the field emission device manufactured by the method according to the present invention of FIGS. 2A through 2I.
Figure 5B:
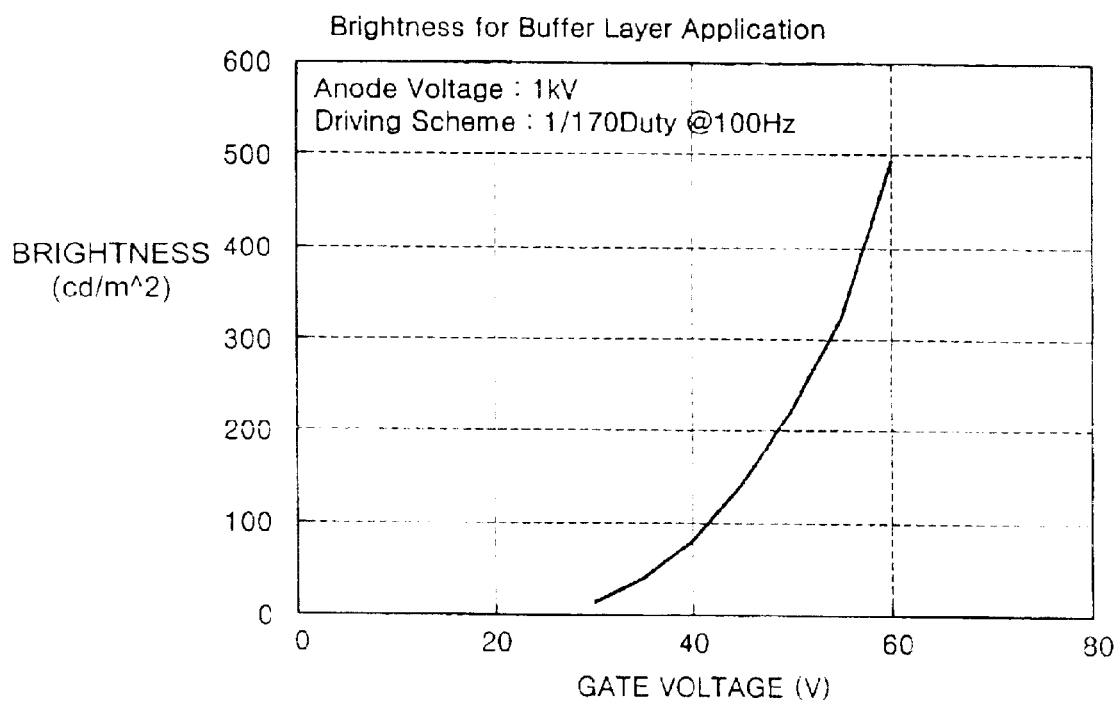
FIG. 5B is a graph illustrating empirically a relationship between brightness and a gate voltage of the field emission device manufactured by the method according to the present invention of FIGS. 2A through 2I.

FIG. 5A is a graph illustrating empirically a relationship between anode current and gate voltage of the field emission device manufactured by the method of the present invention as illustrated in FIGS. 2A through 2I, and FIG. 5B is a graph illustrating empirically a relationship between brightness and gate voltage thereof. As illustrated in FIG. 5A, the field emission device manufactured by the present invention illustrates a very high current and brightness. Since the result of FIG. 5B is obtained when a light emission surface remains spaced about 6 cm from a sensor, it is assumed that the brightness of the field emission device for practical use is higher than that illustrated in FIG. 5B.

According to the present invention, a field emission device having a very high current and brightness can be obtained. Also, a lift-off process is effectively performed using an isolation layer such that a short circuiting between a gate electrode and emitters is prevented. Thus, an improved electron emission device can be obtained. A resistive material 70a that remains at the lower portions of an electron emission material layer allows a current to be uniformly supplied even to emission points of CNTs or nanoparticles, which are uniformly distributed in the highly conductive electron emission material layer 50. Thus, electrons can be uniformly emitted throughout the entire electron emission material layer. Consequently, the life span of the field emission device can be highly increased.

The field emission device of the present invention can be applied to devices requiring emission of electrons, for example, display devices. While the present invention has been particularly illustrated and described with reference to preferred embodiments thereof, it will be understood by those of ordinary skill in the art that various changes in form and details may be made therein without departing from the spirit and scope of the present invention as defined by the following claims.

What is claimed is

1. A method of manufacturing a field emission device, the method comprising.

preparing a substrate structure, the substrate structure comprising a substrate, a cathode electrode formed on the substrate, a gate insulating layer formed on the cathode electrode, the gate insulating layer being perforated by gate insulating holes that expose portions of the cathode electrode, and a gate electrode being perforated by gate holes that correspond to the gate insulating holes, the cathode electrode, the gate insulating layer, and the gate electrode being sequentially stacked on the substrate;

forming a sacrificial layer on a surface of the substrate structure excluding the exposed portions of the cathode electrode, which are exposed by the holes, the sacrificial layer being present on inner side walls of the holes;

forming an isolation layer on the sacrificial layer, the isolation layer adapted to prevent electron emission materials adapted to form emitters from coming into contact with the sacrificial layer;

forming an electron emission material layer by depositing the emission electron materials on the surface of the substrate structure where the isolation layer is formed, the electron emission material layer filling the holes;

removing the isolation layer and the electron emission materials, which are formed on the sacrificial layer, and forming the emitters inside the holes using the electron emission material layer by performing a lift-off process using an etchant, the lift-off process for removing the sacrificial layer that is formed on the surface of the gate electrode and the inner walls of the holes; and firing the emitters.

2. The method of claim 1, the electron emission materials being comprised of a material selected from the group consisting of carbon nanotubes and nanoparticles.

3. The method of claim 1, the electron emission materials comprising an electrically conductive material.

4. The method of claim 3, the electron emission materials comprising Ag.

5. The method of claim 1, the isolation layer being comprised of an electrically resistive material.

6. The method of claim 5, the isolation layer being comprised of a material selected from the group consisting of of $SiO_2$, MgO, a-Si, and p-Si.

7. The method of claim 1, upon application, the isolation layer comprising a material being selected from the group consisting of a paste, a sol-gel and a slurry solution.

8. The method of claim 1, the electron emission materials comprising a conductive material selected from the group consisting of a paste, a sol-gel and a slurry solution.

9. The method of claim 8, the electron emission material comprising Ag.

10. The method of claim 1, wherein the electron emission material layer and the sacrificial layer each comprise photoresist.

11. The method of claim 1, the isolation layer being formed using an IPA/$H_2O$ solution comprising polyvinyl alcohol.

12. The method of claim 1, the electron emission material comprising a binder.

13. The method of claim 3, the electron emission material further comprising a binder.

14. The method of claim 1, the sacrificial layer being patterned and not being blanket.

* * * * *